United States Patent
Kim et al.

(10) Patent No.: US 8,824,805 B2
(45) Date of Patent: Sep. 2, 2014

(54) REGIONAL INFORMATION EXTRACTION METHOD, REGION INFORMATION OUTPUT METHOD AND APPARATUS FOR THE SAME

(75) Inventors: Jae Hyoung Kim, Gyeonggi-do (KR); Jin Hee Lee, Seoul (KR)

(73) Assignee: Seojeon Globe Co., Ltd., Gyeonggi-Do (KR)

( * ) Notice: Subject to any disclaimer, the term of this patent is extended or adjusted under 35 U.S.C. 154(b) by 236 days.

(21) Appl. No.: 13/362,110

(22) Filed: Jan. 31, 2012

(65) Prior Publication Data
US 2012/0195506 A1    Aug. 2, 2012

(30) Foreign Application Priority Data
Jan. 31, 2011    (KR) .................... 10-2011-0009379

(51) Int. Cl.
*G06K 9/46*    (2006.01)
*G06Q 10/00*    (2012.01)

(52) U.S. Cl.
CPC .................................. *G06Q 10/00* (2013.01)
USPC ......................... 382/195; 715/712

(58) Field of Classification Search
CPC ................... G06K 9/6217; G06K 9/6256
USPC ................................. 382/195; 715/712
See application file for complete search history.

(56) References Cited

U.S. PATENT DOCUMENTS

| 6,330,858 B1* | 12/2001 | McDonough et al. ........ 101/208 |
| 2003/0052896 A1* | 3/2003 | Higgins et al. ................ 345/619 |
| 2010/0223551 A1 | 9/2010 | Twig et al. |

FOREIGN PATENT DOCUMENTS

| JP | 2009-187581 | 8/2009 |
| KR | 10-1998-074731 | 11/1998 |
| KR | 1020000007097 | 2/2000 |
| KR | 1020100054184 | 5/2010 |
| KR | 1020100046586 | 7/2010 |

OTHER PUBLICATIONS

Jesus et al: "Geographic Image Retrieval in Mobile Guides", GIR'07, ACM, 2007.*
Pamelar et al: the machine translated English version of JP2009-187581, 2009.*

* cited by examiner

*Primary Examiner* — Ruiping Li
(74) *Attorney, Agent, or Firm* — Stuart H. Mayer; Mayer & Williams PC

(57) ABSTRACT

Provided are a regional information extraction method, a regional information output method, and an apparatus for the same. The regional information output method includes obtaining a regional image through the processing unit, transmitting the regional image to a server through the transmitting/receiving unit, receiving regional information on a geographical position that a regional image feature extracted from the regional image represents through the transmitting/receiving unit, and outputting the regional information through the output unit, wherein the geographical position represents one feature matching to the regional image feature, which is selected from a plurality of features representing a plurality of regional images.

4 Claims, 7 Drawing Sheets

REGIONAL INFORMATION EXTRACTION METHOD, REGION INFORMATION OUTPUT METHOD AND APPARATUS FOR THE SAME

CROSS-REFERENCE TO RELATED APPLICATION

This application claims priority to Korean Patent Application No. 10-2011-0009379 filed on Jan. 1, 2011 and all the benefits accruing therefrom under 35 U.S.C. §119, the contents of which are incorporated by reference in their entirety.

BACKGROUND

The present disclosure relates to a technique for extracting and outputting information on a specific region, and more particularly, to a technique using a regional image.

Typically, in order to obtain information on a name, location, and national flag of each country of the world or a specific region on the earth, a user may need to personally search a globe, a map or other documents.

Korean Patent Publication No. 10-2000-0007097 discloses a device for helping to learn names, geographical locations, and national flags of countries and a specific region on the earth. This device includes a map of the world, which is equipped with a plurality of control switches for device control and a light generator for each region divided by a boundary or a specific criteria. Additionally, the device may further include a voice recognition device for recognizing a voice inputted through a microphone, and an information conversion device for finding out a position in a memory device that stores voice information corresponding to a voice recognition result or to a manipulated switch while simultaneously lighting a light generator in a corresponding switch and a light generator of a selected portion in the map of the world. Moreover, the device may further include: an output device for accessing a memory device and extracting corresponding data after receiving information from the information conversion device in order to output multimedia information; a memory device for storing guide data varying according to a setting situation of a control switch and character and voice data and image data for each language related to several countries of the world and a specific area; and a control device for controlling the above devices.

SUMMARY

A typical device for automatically notifying of 'regional information' including various information such as history, culture, politics, economy, and demographics related to a specific area includes additionally attached components besides the globular part. As a result, the typical device is bulky and expensive, and provides limited information.

Recently, a portable user device having a network access function is widely distributed. The present invention may resolve the above issue by using a basic globular part and a user device having a network access function.

The above embodiment may not limit the scope of the present invention.

The present disclosure provides a programmable user device and/or server. If the user device obtains a specific regional image, information on a geographical position on the earth that the specific regional image represents is provided to the user device.

For this, an earth surface image provided in advance or a map image which is represented by processing or the earth's surface according to predetermined standards, is divided into a plurality of regions. Then, a regional image feature of each regional image may be extracted, and then the extracted regional feature may be provided as a database. Here, the regional image feature represents a feature representing the regional image.

The regional image feature may be expressed in a vector by using one of more difference values between the light intensities of pixels in the obtained regional image, for example, differential values of the light intensity between pixels arranged along an x-axis and/or differential values of the light intensity between pixels arranged along a y-axis.

Once the user device obtains a specific regional image, a regional image feature is extracted from the obtained regional image through the above-mentioned method, and then, the extracted regional image feature is compared with a plurality of regional image features of a plurality of regional images stored in the database. Therefore, it can be determined that which one of the plurality of regional images matches to the specific regional image that the user device obtained. Once the regional image matching to the specific regional image that the user device obtained is determined, information on a geographical position on the earth that the regional image represents can be obtained. For this, a first database including information on several geographical positions on the earth may be provided separated from a second database including the extracted regional image feature. Otherwise, the first and second database may be provided in a single computing device in a integrated manner.

If a user device can be connected to information communication network such as WEB or the internet, it may obtain the specific regional image by capturing it from the internet. Otherwise, if the user device includes a camera module, it may obtain the specific regional image by taking a picture of a certain region of a map or globe by the camera module.

In accordance with an exemplary embodiment, a method of outputting regional information in a user device including a processing unit, a transmitting/receiving unit, and an output unit includes: obtaining a regional image through the processing unit; transmitting the regional image to a server through the transmitting/receiving unit; receiving regional information on a geographical position that a regional image feature extracted from the regional image represents through the transmitting/receiving unit; and outputting the regional information through the output unit, wherein the geographical position represents one feature matching to the regional image feature, which is selected from a plurality of features representing a plurality of regional images.

The regional image feature may be extracted by image-processing the regional image.

The regional image feature may be calculated from one or more difference values in light intensity between at least two pixels in the regional image.

Each of the plurality of features may be calculated from one or more difference values in light intensity between at least two pixels in each of the plurality of regional images.

The regional image may be obtained by deforming a non-rectangular image into a rectangular image, the non-rectangular image being defined by a couple of specific latitudes and a couple of specific longitudes of a globe where lines representing latitudes and longitudes are printed.

In accordance with another exemplary embodiment, a local information extraction server includes: a transmitting/receiving unit for receiving a regional image obtained by a user device; and a processing unit for extracting a regional image feature from the regional image and extracting regional information on a geographical position that one feature matching to the regional image feature represents, which is selected from a plurality of features representing a plurality of regional images, wherein the transmitting/receiving unit transmits the regional information to the user device to allow the regional information to be outputted through the user device.

The regional image feature may be extracted by image-processing the regional image.

The regional image feature may be calculated from one or more difference values in light intensity between at least two pixels in the regional image.

Each of the plurality of features may be calculated from one or more difference values in light intensity between at least two pixels in each of the plurality of regional images.

The regional image may be obtained by deforming a non-rectangular image into a rectangular image, the non-rectangular image being defined by a couple of specific latitudes and a couple of specific longitudes of a globe where lines representing latitudes and longitudes are printed.

In accordance with yet another exemplary embodiment, a local information extraction server includes: a transmitting/receiving unit for receiving information on a regional image feature extracted from a regional image obtained by a user device; and a processing unit for extracting regional information on a geographical position that one feature matching to the information, which is selected from a plurality of features representing a plurality of images, wherein the transmitting/receiving unit transmits the regional information to the user device to allow the regional information to be outputted through the user device.

The regional image feature may be extracted by image-processing the regional image.

The regional image feature may be calculated from one or more difference values in light intensity between at least two pixels in the regional image.

Each of the plurality of features may be calculated from difference values in light intensity between at least two pixels in each of the plurality of regional images.

The regional image may be obtained by deforming a non-rectangular image into a rectangular image, the non-rectangular image being defined by a couple of specific latitudes and a couple of specific longitudes of a globe where lines representing latitudes and longitudes are printed.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, specific embodiments will be described in detail with reference to the accompanying drawings.

Figure 1:
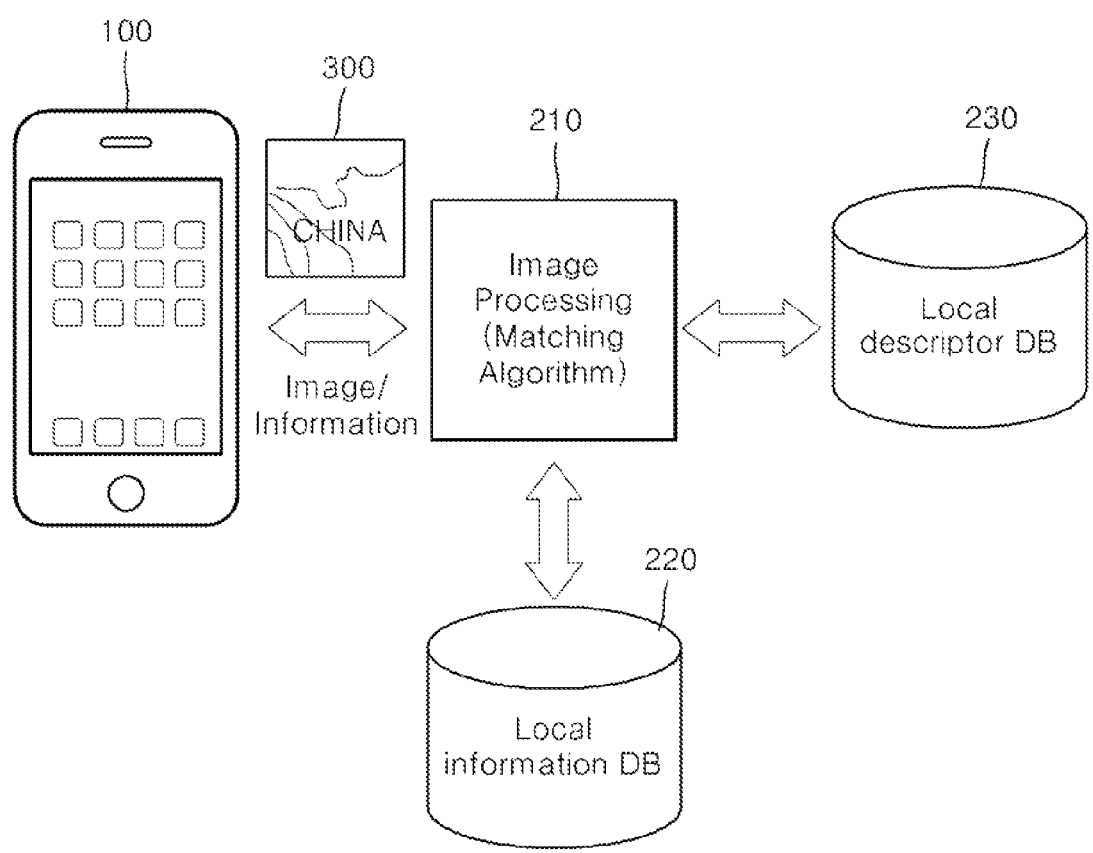
FIG. 1 is a view illustrating a schematic regional information extraction system according to an embodiment of the present invention.

FIG. 1 is a view illustrating a schematic regional information extraction system according to an embodiment of the present invention.

A user device 100 may obtain a regional image 300 from the internet or a camera module installed at itself. When the camera module is used, the regional image 300 may be obtained by taking a picture of at least a portion of a globe or map provided in advance.

A processing unit 210 processes the regional image 300 that the user device 100 obtained, thereby extracting a regional image feature (hereinafter, this may be simply referred to as 'feature'). Hereinafter, the expression 'obtain' may be used for the term 'regional image', and the expression 'extract' may be used for the term 'regional image feature'. The regional image feature is information representing a regional image. An image provided from the internet may include GPS information, but the regional image feature is conceptually distinguished from the GPS information. The reason is that the GPS information includes numerical information on a longitude and a latitude, but the regional image feature is obtained by processing and extracting image information such as the color, brightness, and saturation from the regional image 300.

A local descriptor database (DB) 230 may store features of a plurality of regional images, which are extracted in advance. At this point, each of the plurality of regional images may be obtained in advance from a map or globe.

The processing unit 210 may compare a regional image feature (that is, a regional image feature that the user device 100 extracts), which is extracted from the regional image that the user device 100 obtained, with the plurality of regional image features stored in the local descriptor DB 230. A process for comparison may be executed according to a predetermined matching algorithm.

The above regional image feature may be provided in a number expressed in a scalar or vector form. Moreover, the matching algorithm may include a step for comparing distances between vectors.

Through the comparison in the processing unit 210, a regional image feature, which is the most similar to the regional image feature that the user device 100 extracts, may be selected from the plurality of regional image features stored in the local descriptor DB 230. Therefore, it can be determined which position on the earth (that is, a geographical position) the regional image 300 that the user device 100 obtains corresponds to.

The local information DB 220 may store regional information corresponding to a plurality of geographical positions on the earth, and may provide the regional information if the processing unit 210 requests information on a specific regional position. For example, when a specific geographical position refers to New York in United States, a variety of information on New York may be provided. This information may include texts, images, and sounds.

According to an embodiment, the processing unit 210 may provide a menu, which allows a user to select information on a specific geographical position, for example, in New York, by each field. That is, if the regional image 300 that the user device 100 obtained indicates New York city, the processing unit 210 may provide a menu related to fields such as politics, economy, society, and culture. If the culture menu is selected, the names of museums and theatres may be suggested as sub-information of the culture field. In order to suggest the above names, the processing unit 210 may obtain sub-information in advance from the local information DB 220. Then, when a user selects one of the museums, the processing unit 210 may obtain information on the selected museum from the local information DB 220 and then may provide the obtained information to the user.

All of processing unit 210, local descriptor DB 230, and local information DB 220 may be provided in a user device 100. However, if the user device 100 has low information processing ability, at least one of the processing unit 210, the local descriptor DB 230, and the local information DB 220 may be installed in at least one server. If doing so, the processing load required for the user device 100 may be reduced.

For example, in order to reduce the processing load of the user device 100, the processing unit 210 may be installed in a processing server. The local descriptor DB 230 may be provided in a first information server and the local information DB 220 may be provided in a second information server. At least one of the processing server, the first information server, and the second information server may be the same server. That is, at least one of the processing unit 210, the local descriptor DB 230, and the local information DB 220 may be provided together in one server.

Figure 2A:
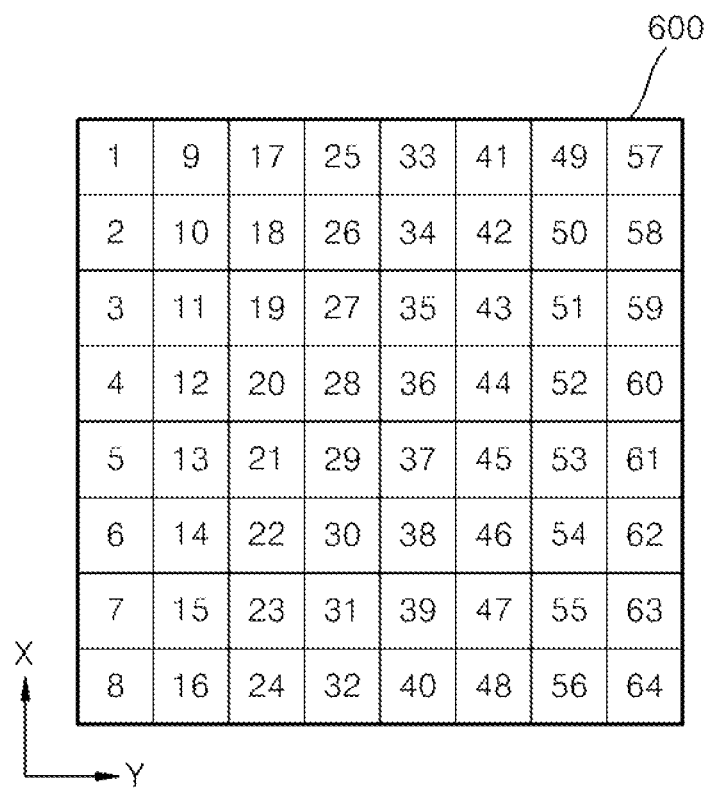
FIG. 2A is a view illustrating a method of extracting a regional image feature from a regional image according to an embodiment of the present invention.
Figure 2B:
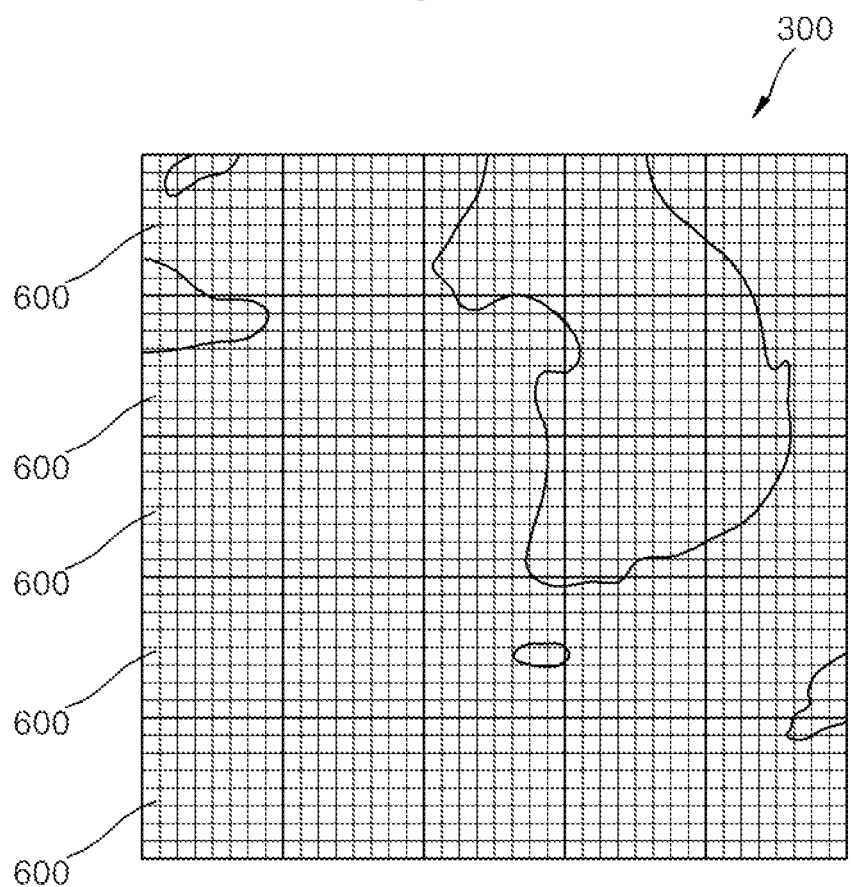
FIG. 2B is a view illustrating that a plurality of image areas can exist in a regional image according to an embodiment of the present invention.

FIGS. 2A and 2B are views illustrating a method of extracting a regional image feature from a regional image according to an embodiment of the present invention.

When the user device 100 of FIG. 1 obtains the regional image 300, the processing unit 210 may divide the regional image 300 into a plurality of image areas. In addition, when a regional image is obtained in advance from a map or globe in order to generate the local descriptor DB 230, the regional image 300 may be divided into a plurality of image areas. FIG. 2A is a view of an image area 600 among the above image areas. Each box represents one pixel and the numbers 1 to 64 indicates the respective boxes (pixels). In the divided area, there may be N pixel columns along the y-axis and M pixel rows along the x-axis. In FIG. 2A, M=N=8.

According to an embodiment of the present invention, a parameter using a variation of intensity between pixels may be suggested as a feature of each regional image. At this point, intensity variation may be calculated along the x-axis or the y-axis. For example, an intensity difference between the pixel 1 and the pixel 2 of FIG. 2A may be represented in {Δ1,2} and an intensity difference between the pixel 2 and the pixel 1 may be represented in {Δ2,1}. At this point, {Δ1,2} and {Δ2,1} have the same absolute value, but have respectively different signs. Likewise, an intensity difference between the pixel 1 and the pixel 9 may be represented in {Δ1,9}.

According to an embodiment of the present invention, a feature of a regional image may be expressed by a plurality of vectors, each vector may be represented by Equation 1.

$$v = (\Sigma d_x, \Sigma d_y, \Sigma |d_x|, \Sigma |d_y|)$$ [Equation 1]

In equation 1, $\Sigma d_x$ represents the sum of differences in intensity variation between pixels, which is calculated along the x-axis, $\Sigma d_y$ represents the sum of differences in intensity variation between pixels, which is calculated along the y-axis, $\Sigma |d_x|$ represents the sum of the absolute values of differences in intensity variation between pixels, which is calculated along the x-axis, and $\Sigma |d_y|$ represents the sum of the absolute values of differences in intensity variation between pixels, which is calculated along the y-axis.

For example, $\Sigma d_x$ may be the sum of {Δ1,5}, {Δ3,4}, {Δ5,6}, . . . , {Δ59,60}, {Δ61,62}, {Δ63,64}. Unlike this, according to another embodiment, $\Sigma d_x$ may be the sum of {Δ1,2}, {Δ2,3}, {Δ3,4}, . . . , {Δ61,62}, {Δ62,63}, {Δ63,64}.

Additionally, for example, $\Sigma d_y$ may be the sum of {Δ1,9}, {Δ17,25}, {Δ33,41}, . . . , {Δ24,32}, {Δ40,48}, {Δ56,64}. Unlike this, according to another embodiment, $\Sigma d_y$ may be the sum of {Δ1,9}, {Δ9,17}, {Δ17,25}, . . . , {Δ40,48}, {Δ48,56}, {Δ56,64}.

Additionally, for example, $\Sigma |d_x|$ may be the sum of absolute values of {Δ1,2}, {Δ3,4}, {Δ5,6}, . . . , {Δ59,60}, {Δ61,62}, {Δ63,64}, or {Δ1,2}, {Δ2,3}, {Δ3,4}, . . . , {Δ61,62}, {Δ62,63}, {Δ63,64}.

Moreover, for example, $\Sigma |d_y|$ may be the sum of absolute values of {Δ1,9}, {Δ17,25}, {Δ33,41}, . . . , {Δ24,32}, {Δ40,48}, {Δ56,64} or {Δ1,9}, {Δ9,17}, {Δ17,25}, . . . , {Δ40,48}, {Δ48,56}, {Δ56,64}.

FIG. 2B is a view illustrating a plurality of image areas 600 in one a regional image 300. The regional image 300 shown in FIG. 2B includes a portion of the Korean Peninsula and the sea around it. The regional image 300 of FIG. 2B includes the image areas 600 of the five columns along the horizontal axis and the five rows along the vertical axis. Accordingly, the total number of the image areas 600 is 25 (=5*5). One vector v in Equation 1 may be a value representing one image area 600. Accordingly, the regional image 300 of FIG. 2B is represented with total 25 vectors, each obtained from Equation 1.

Figure 3:
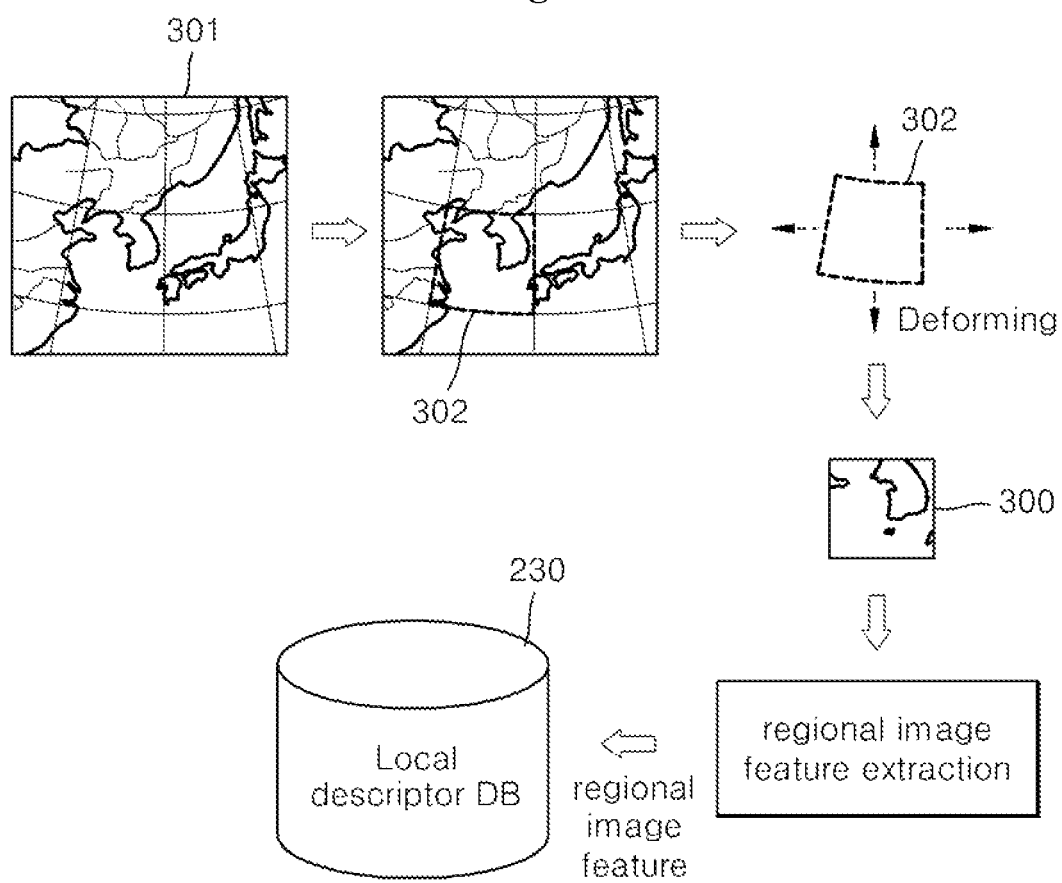
FIG. 3 is a view illustrating a method of obtaining a regional image from a map, extracting a regional image feature from the obtained regional image, and storing the extracted regional image feature into a database, according to an embodiment of the present invention.

FIG. 3 is a view illustrating a method of obtaining a regional image from a map, extracting a regional image feature from the obtained regional image, and storing the extracted regional image feature into a database, according to an embodiment of the present invention.

Referring to FIG. 3, an image 301 in an arbitrary range may be obtained in advance from a flat map or a spherical globe. At this point, the map or globe may be identical to that captured by the user device 100. If there are lines representing latitudes and longitudes on a map or globe, a regional image 302 in a specific latitude and longitude range may be obtained based on the lines. If there is no latitude and longitude on a map or globe, an arbitrary rectangular boundary line is created and a regional image 302 therein may be obtained. At this point, in the case of the globe, since the regional image 302 is not provided in a rectangular shape, it may be deformed into a rectangular image. However, in the case of the flat map, the deforming is not necessary. In the case of the map, the obtained regional image 302 may be regarded as being identical to the regional image 300. In the case of the globe, the obtained regional image 302 is deformed, and then, converted into the regional image 300. The deforming process may be any process that converts a non-rectangular image into a rectangular image.

The obtained regional image 300 may include a plurality of image areas 600 as shown in FIG. 2B. Each image area 600 may be represented with a vector expressed in Equation 1. Accordingly, a regional image feature representing one regional image 300 may be expressed with one set including a plurality of vectors. Regional image features representing a plurality of regional images obtainable from a map or globe may be represented with vector sets. These regional image features may be stored in the local descriptor DB 230 of FIG. 1. For example, the local descriptor DB 230 may include a plurality of vector sets related to specific regional images on the earth. For example, a first vector set may correspond to a first regional image on the earth, and a second vector set may correspond to a second regional image on the earth.

Figure 4:
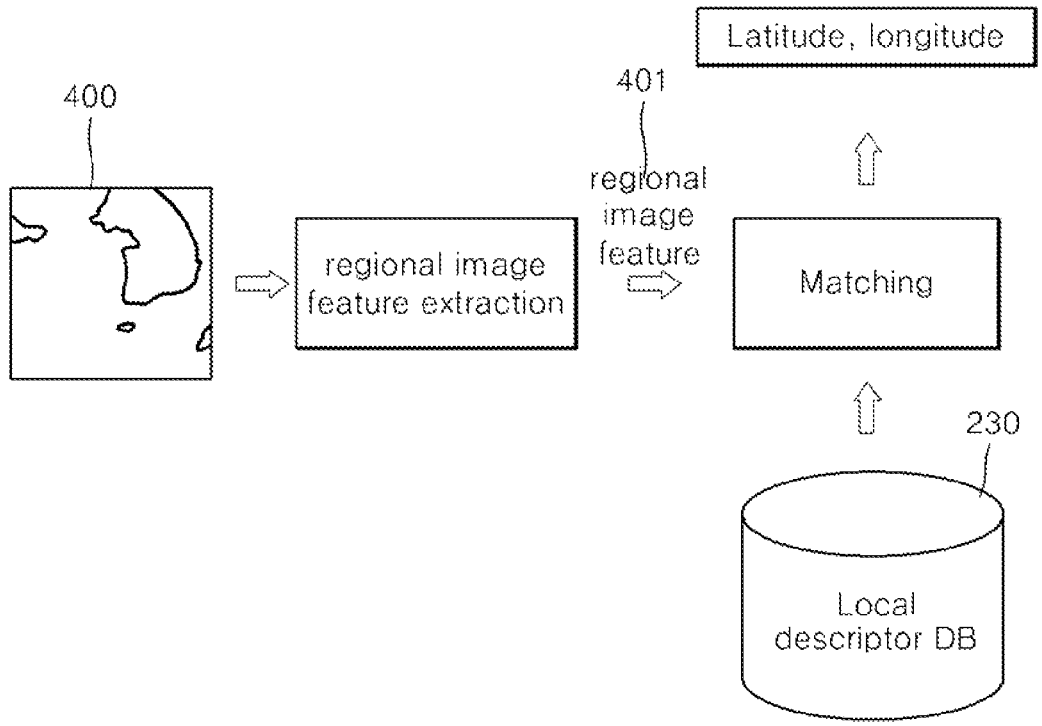
FIG. 4 is a view illustrating a method of determining which geographical position on the earth corresponds to a regional image obtained from a user device according to an embodiment of the present invention.

FIG. 4 is a view illustrating a method of determining which geographical position on the earth corresponds to a regional image obtained from a user device according to an embodiment of the present invention.

A region image feature 401 may be extracted from a regional image that a user device obtained through the method of FIG. 3. At this point, the user device may obtain a regional image 400 from a different map or globe than that of FIG. 3. The regional image feature 401 may be represented with a vector set as described above. Then, a regional image feature, which is the most similar to the regional image feature 401 that the user device extracted, may be selected from the plurality of regional image features stored in the local descriptor DB 230 of FIG. 3. This selection may be performed by comparing and matching a set of vectors representing the regional image feature 401 with and to the vector sets stored in the regional descriptor DB 230. For example, the matching may be performed through an algorithm that searches for the minimum distance difference between vectors. Since each specific geographical position on the earth corresponds to one of the regional image features stored in the local descriptor DB 230, it can be observed which geographical position on the earth (for example, the longitude and latitude) the regional image 400 that the user device obtained represents.

The processing unit 210 of FIG. 1 may obtain regional information on a corresponding geographical position from the local information DB 220, by using the geographical position that the regional image 400, which is obtained by the user device, represents. For example, if the regional image 400 represents the Korean Peninsula, the processing unit 210 may obtain a variety of information on Korea from the local information DB 220. At this point, the variety of information on Korea includes history, cities, and culture, and is not limited thereto.

Figure 5:
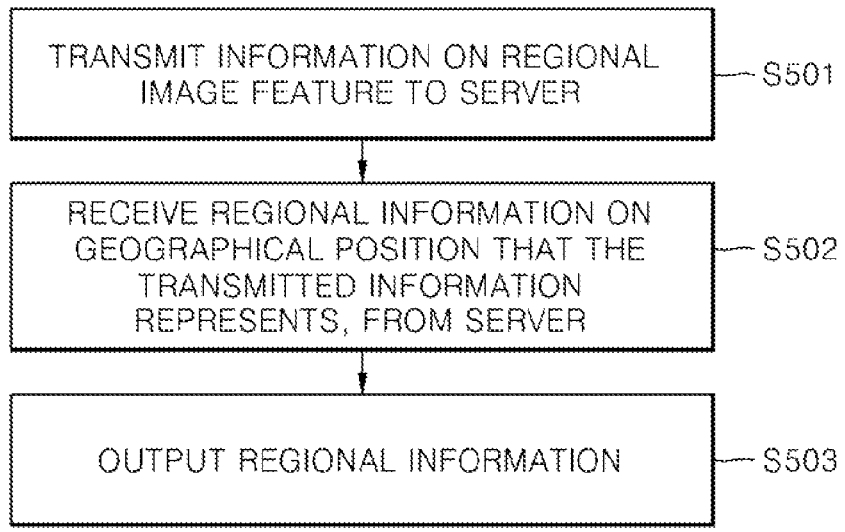
FIG. 5 is a flowchart illustrating a method of a user device to output regional information according to an embodiment of the present invention.

FIG. 5 is a flowchart illustrating a method of a user device to output regional information according to an embodiment of the present invention.

At step S501, information (hereinafter, referred to as 'first information' in the description of FIG. 5) on a regional image feature that the user device extracted is transmitted to the server. At step S502, the user device receives regional information on a geographical position that the first information represents from the server. At step S503, the user device may output the regional information. At this point, sound, image, and vibration may be outputted through an output device installed at the user device, or may be outputted by providing a signal to an output device separated from the user device. Furthermore, the above regional image may be obtained by taking a picture of a portion of a globe or map through a camera module installed at the user device.

At step S502, the regional information may be information on a geographical position that one regional image feature matching to the first information represents, which is selected from a plurality of pre-stored regional image features representing a plurality of regional images. At this point, the first information may be a regional image feature extracted from the regional image that user device obtained.

A process for comparing the regional image feature that the user device extracted with the plurality of regional image features may be performed in a server. The first information may be the regional image itself or a parameter representing a regional image feature, for example, a set of vectors obtained from Equation 1.

At step S501, the first information may be information on one regional image feature matching to the regional image feature that the user device extracted, which is selected from the plurality of pre-stored regional image features representing a plurality of regional images. At this point, the comparison between the regional image feature that the user device extracts and the plurality of regional image features may be performed in the user device. The regional information at step S502 may be information on a geographical position that the one matched regional image feature represents.

In a modified embodiment, at step S501, the first information may be information on the latitude or longitude that the regional image obtained by the user device represents, or information on a geographical position that the regional image obtained by the user device represents. At this point, the user device may perform at least a part of the functions of the processing unit 210, and also may include the local descriptor DB 230.

Figure 6:
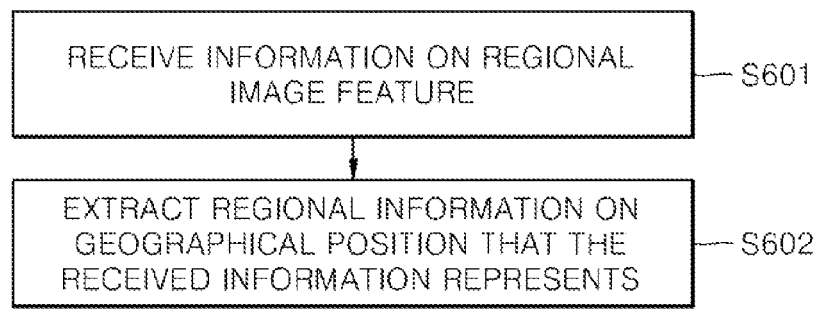
FIG. 6 is a flowchart illustrating a method of a server to extract regional information according to an embodiment of the present invention.

FIG. 6 is a flowchart illustrating a method of a server to extract regional information according to an embodiment of the present invention.

At step 601, a server receives information (hereinafter, referred to as 'first information' in the description of FIG. 6) on a regional image feature that the user device obtained. At step S602, the server extracts regional information on a geographical position that the first information represents. As described with reference to FIG. 5, the first information may be information on a regional image itself that the user device obtained, a specific parameter representing the feature of the regional image that the user device obtained, information on the latitude and longitude that the regional image obtained by the user device represents, or information on the geographical position that the regional image obtained by the user device represents. If the first information is the regional image itself that the user device obtained, the server may include all the processing unit 210, the local descriptor DB 230, and the log information DB 220. Unlike this, if the first information is a feature parameter representing the feature of the regional image that the user device obtained, a function for extracting the feature of the regional image may be omitted from the sever, and may be performed in the user device instead. Additionally, if the first information is information on the geographical position that the regional image represents, the local descriptor DB 230 may be omitted from the server.

At step S602, the regional information may be information on a geographical position that one regional image feature matching to the first information represents, which is selected from a plurality of pre-stored regional image features representing a plurality of regional images. At this point, the first information may be a feature parameter value representing the regional image itself that the user device obtained or the feature of the regional image.

If the first information of FIGS. 5 and 6 is the regional image itself that the user device obtained, since a process for extracting a regional image feature from the regional image that the user device obtained does not need to be performed in the user device, the processing load of the user device may be reduced.

Unlike this, if the first information is the vector(s) expressed in Equation 1, a process for extracting a regional image feature from the regional image that the user device obtained needs to be performed in the user device, and the user device transmits information on the vector instead of the regional image itself to the server. At this point, the user device may need to include at least a part of the function of the processing unit 210 described with reference to FIG. 1.

Unlike this, when one feature is selected from the features representing a plurality of regional images and then is provided as the first information, the user device should include at least part of the function of the processing unit 210 of FIG. 1 and also needs to be able to access the local descriptor DB 230. At this point, the processing load of the user device may be increased.

Figure 7:
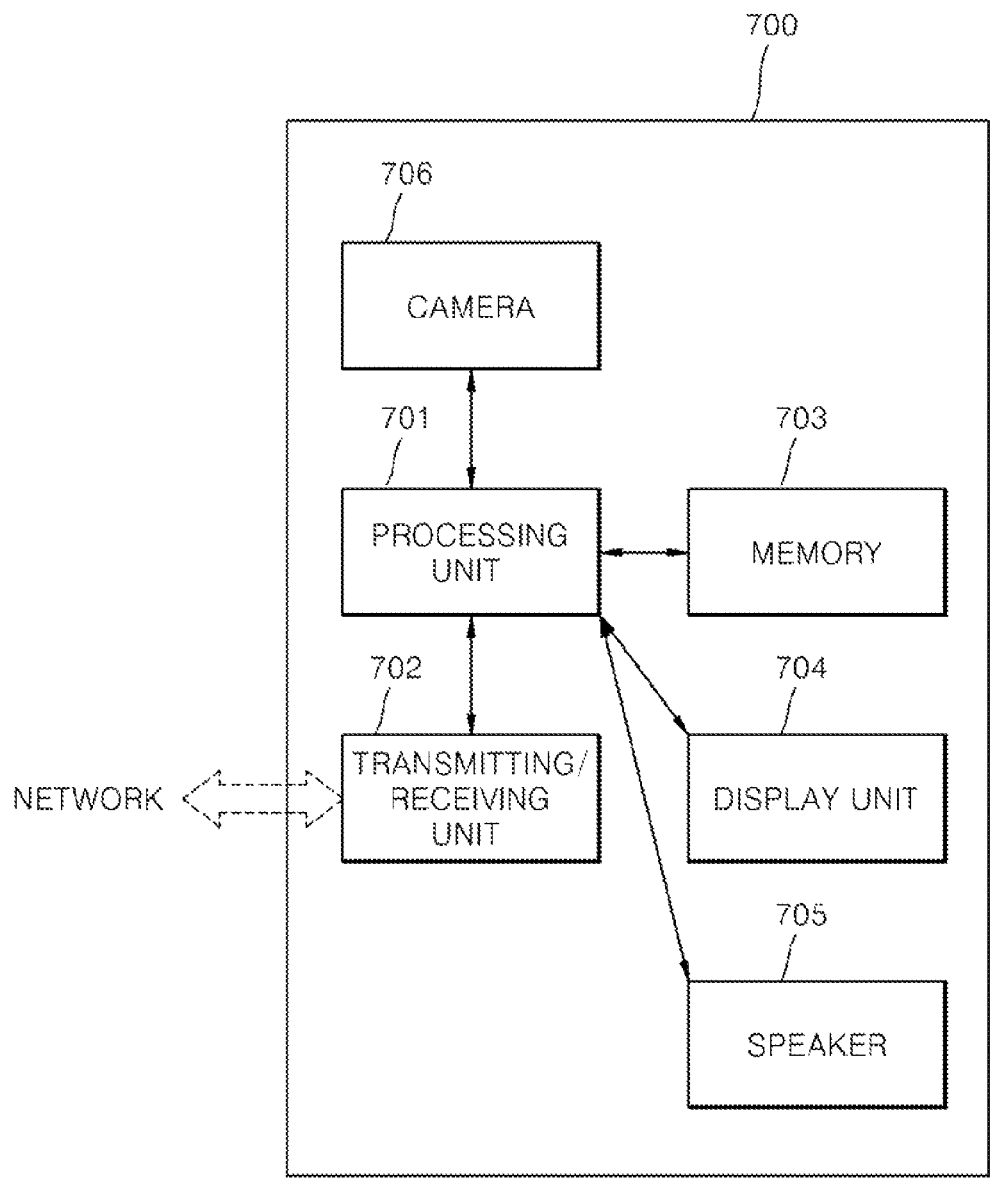
FIG. 7 is a view of a device configured to output regional information according to an embodiment of the present invention.

FIG. 7 is a view of a device configured to output regional information according to an embodiment of the present invention.

The device 700 of FIG. 7 as a user device may include a processing unit 701 for extracting information on a feature of a regional image and a transmitting/receiving unit 702 for transmitting the information to a server and receiving regional information on a geographical position that the information represents from the server. At this point, the transmitting/receiving unit 702 may include an antenna or a network access hardware. Additionally, the device 700 may further include a memory 703, a display unit 704, a speaker 705, and a camera 706. The above regional image may be obtained from the camera 706 or from the transmitting/receiving unit 702 through an external network. Additionally, the processing unit 701 may output the received regional information from the server through the display unit 704 or the speaker 705, or may provide the received information as digital or analog data to an additional output device to output it.

This device 700 may be configured to provide a method of outputting regional information, which is described with reference to FIG. 5.

Figure 8:
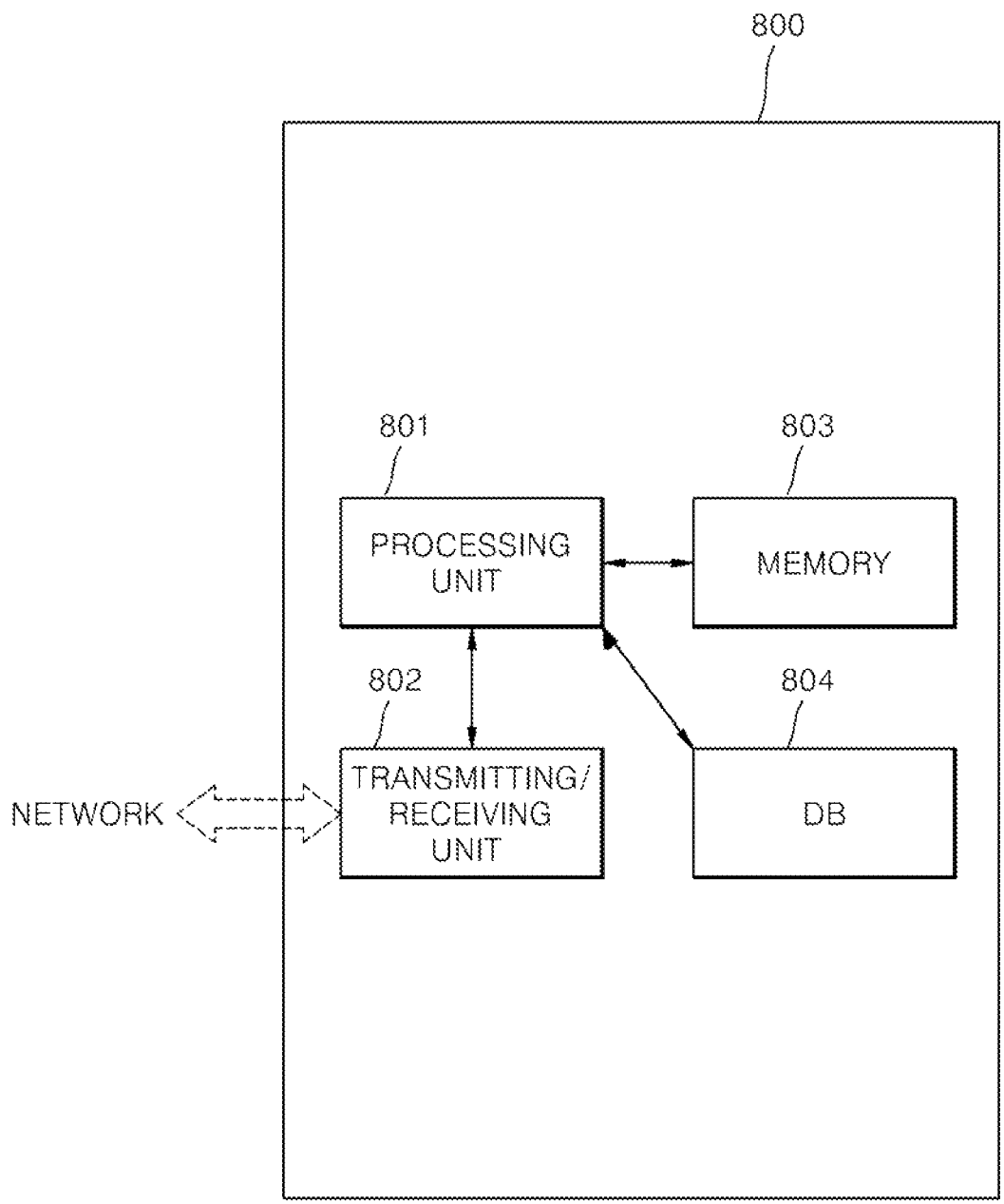
FIG. 8 is a view of a device configured to output regional information according to another embodiment of the present invention.

FIG. 8 is a view of a device configured to output regional information according to an embodiment of the present invention.

The device 800 as a server may include a transmitting/receiving unit 802 for receiving information on a feature of a regional image and a processing unit 801 for extracting regional information on a geographical position that the information represents. At this point, the transmitting/receiving unit 802 may include an antenna or a network access hardware. Additionally, the device 800 may further include a memory 803 and a DB 804. The DB 804 may include at least one of the local descriptor DB 230 and the regional information DB 220 described with reference to FIG. 1.

This device 800 may be configured to provide a method of outputting regional information, which is described with reference to FIG. 6.

According to an embodiment of the present invention, since the present invention may be realized using software, it may be realized in a compact mobile user device. Additionally, since information on a specific geographical position is stored in a server as a database, information provided to a user device may be updated by just simply updating the database of the server.

According to an embodiment of the present invention, provided is a method of automatically notifying a user, who uses a basic structural globe and a user device having a network access function, of regional information on a specific region without additional other devices. The above effect may not limit the scope of the present invention.

Although the regional information extraction method, regional information output method, and apparatus for the same have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. A method of outputting regional information at a user device including an output unit and a camera module, the method comprising:
  taking a picture of a certain region on a globe by the camera module, wherein a plurality of lines representing a plurality of latitudes and a plurality of longitudes are printed on the globe;
  selecting a part of the picture to provide a non-rectangular image, wherein boundary of the non-rectangular image is defined by two latitude lines and two longitude lines included in the picture;
  deforming the non-rectangular image into a rectangular image, wherein the rectangular image is set as a regional image;
  extracting a first regional image feature from the regional image;
  extracting regional information on a geographical position which is represented by one regional image feature matching to the first regional image feature, wherein the one regional image feature is selected from a plurality of regional image features representing a plurality of regional images; and
  outputting the regional information through the output unit,
  wherein the first regional image feature is expressed by a plurality of vectors, wherein each of the plurality of vectors is represented by [Equation 1], $$v = \left( \sum d_x, \sum d_y, \sum |d_x|, \sum |d_y| \right) \quad \text{[Equation 1]}$$

where, $\Sigma d_x$ represents a sum of differences in intensity variation between pixels, which is calculated along an x-axis,
  $\Sigma d_y$ represents a sum of differences in intensity variation between the pixels, which is calculated along a y-axis, $$\sum |d_x|$$

represents a sum of absolute values of differences in intensity variation between the pixels, which is calculated along the x-axis, and $$\sum |d_y|$$

represents a sum of absolute values of differences in intensity variation between the pixels, which is calculated along the y-axis.

2. The method according to claim 1, wherein each of the plurality of regional images features is calculated from difference values in light intensity between at least two pixels in each of the plurality of regional images.

3. A regional information extraction server comprising:
  a transmitting/receiving unit for receiving a regional image obtained by a user device; and
  a processing unit for extracting a first regional image feature from the regional image and extracting regional information on a geographical position which is represented by one regional image feature matching to the first regional image feature, wherein the one regional image feature is selected from a plurality of regional image features representing a plurality of regional images, wherein the transmitting/receiving unit transmits the regional information to the user device to allow the regional information to be outputted through the user device, wherein, the regional image is a rectangular image obtained by deforming a non-rectangular image into the rectangular image, the non-rectangular image is a part of a picture of a certain region on a globe which is taken by a camera module installed on the user device, wherein a plurality of lines representing a plurality of latitudes and a plurality of longitudes are printed on the globe, boundary of the non-rectangular image is defined by two latitude lines and two longitude lines included in the picture, and the first regional image feature is expressed by a plurality of vectors, wherein each of the plurality of vectors is represented by [Equation 1].

$$v = \left( \sum d_x, \sum d_y, \sum |d_x|, \sum |d_y| \right) \quad \text{[Equation 1]}$$

where, $\Sigma d_x$ represents a sum of differences in intensity variation between pixels, which is calculated along an x-axis, $\Sigma d_y$ represents a sum of differences in intensity variation between the pixels, which is calculated along a y-axis, $$\sum |d_x|$$

represents a sum of absolute values of differences in intensity variation between the pixels, which is calculated along the x-axis, and $$\sum |d_y|$$

represents a sum or absolute values of differences in intensity variation between the pixels, which is calculated along the y-axis.

4. The regional information extraction server according to claim 3, wherein each of the plurality of regional image features is calculated from difference values in light intensity between at least two pixels in each of the plurality of regional images.

* * * * *